United States Patent

Taneda

[11] Patent Number: 5,900,165
[45] Date of Patent: May 4, 1999

[54] ELECTRIC DISCHARGE MACHINING APPARATUS

[75] Inventor: Atsushi Taneda, Tokyo, Japan

[73] Assignee: Mitsubishi Denki Kabushiki Kaisha, Tokyo, Japan

[21] Appl. No.: 08/971,714

[22] Filed: Nov. 17, 1997

[30] Foreign Application Priority Data

Apr. 24, 1997 [JP] Japan .................................. 9-107829

[51] Int. Cl.⁶ .............................. B23H 1/02; B23H 7/20; B23H 7/32
[52] U.S. Cl. .......................................................... 219/69.16
[58] Field of Search .............................. 219/69.16, 69.17; 364/474.04

[56] References Cited

U.S. PATENT DOCUMENTS

| 5,117,083 | 5/1992 | Kawamura | .............................. | 219/69.16 |
| 5,428,201 | 6/1995 | Kaneko et al. | ........................ | 219/69.16 |

FOREIGN PATENT DOCUMENTS

| 60-150910 | 8/1985 | Japan . |
| 64-16317 | 1/1989 | Japan . |
| 5-116301 | 5/1993 | Japan . |
| 7124821 | 5/1995 | Japan . |

*Primary Examiner*—Geoffrey S. Evans
*Attorney, Agent, or Firm*—Sughrue, Mion, Zinn, Macpeak & Seas, PLLC

[57] ABSTRACT

An electric discharge machine apparatus has a numeric control unit which can optimally set jumping conditions without forcing the user to perform any complicated setting operation. The numeric control unit calculates an optimal jumping velocity from a value indicating a machine-allowable load for the electric discharge machining apparatus, a machining area according to the electric discharge machining conditions, and a machining gap length computed from the electric discharge machining conditions. The machining area is computed by the ratio between the proceeding velocity in machining and a discharge pulse frequency. The machining gap length is computed according to the current value of a machining current pulse as well as to a voltage loaded to the machining gap.

9 Claims, 9 Drawing Sheets

ELECTRIC DISCHARGE MACHINING APPARATUS

FIELD OF THE INVENTION

The present invention relates to an electric discharge machining apparatus, and more particularly to an electric discharge machining apparatus having a function of a jumping operation for removing powder due to machining from a machining gap.

BACKGROUND OF THE INVENTION

An electric discharge machining apparatus melts and removes a work in a machining liquid by supplying pulse field power between an electrode and the work each provided in the machining liquid. It is a known fact that powder due to machining is generated in a machining gap in electric discharge machining and unless the powder due to machining is removed with any method, insulation of and repetition of electric discharge in the machining gap can not be maintained in a normal state, which causes an arc discharge state, whereby the electric discharge machining is badly affected so that machining efficiency is lowered and a condition of a machined surface is degraded.

A method of removing the powder due to machining includes methods such as machining liquid injection, blowing, and suction, and so-called a jumping operation in which an electrode is reciprocated intermittently and at high velocity is well known as one of the methods used in addition to the above methods.

In a case of machining any work having a form to which liquid machining such as injection, blowing, or sucking for discharging the powder can not physically be applied, an electrode jumping operation is the only method for removing the powder, and for this reason this operation is generally regraded as one of applicable conditions therefor.

FIG. 5 is a view showing an example of the jumping operation. In FIG. 5, the sign J indicates Z-axial movement characteristics of an electrode (jumping path characteristics) and the sign P indicates electric discharge machining time characteristics in a jumping operation. It should be noted that the sign Pp indicates a machining period while the sign P1 indicates a non-machining period (idling time).

Jumping conditions include a jumping height (a jumping-up rate) Jup, a jumping time Jt, and a jump-down time (machining time) Jdown, and selection of those parameters (jumping conditions) is an extremely important factor for efficiently discharging out the powder and improving a machining velocity.

For example, a jumping-up rate Jup raised to a sufficiently high level enables discharge of machining powder from a deep machining hole in a case where a depth of machining becomes deeper. A jumping velocity Jup/Jt is a factor that gives effects over reduction of time in jumping (non-machining time P1) which does not contribute to machining as well as over the powder discharge efficiency based on the pumping effects of jumping, and also which gives large effects over a machining velocity.

As described above, a machining time, a machining velocity, and a maximum machining depth are affected depending on the way of setting a jumping-up rate, a jumping time, a jump-down time, and a jumping velocity, each of which is a parameter for a jumping operation, namely depending on the way of setting a path to be made by the jumping operation, and for this reason an operation for setting of conditions for jumping operations is very important.

Generally, by setting a jumping velocity and a jumping-up rate to possibly maximum ones respectively, the powder discharge efficiency becomes higher, and for this reason the machining efficiency and machining velocity are improved.

As shown in FIG. 5, however, a machining gap is widened in jumping up so that a discharge pulse is not generated and machining does not proceed, namely an idling time P1 is generated, and machining indicates time is equivalent to a machining period Pp which is not jumping up, so that a ratio of the actual machining time in the entire machining time is reduced when jumping height Jup becomes higher, which causes reduction of a machining velocity.

Namely, the jumping operation has a factor contradicting such that a machining velocity is improved by enhancing machining-liquid discharge efficiency as well as by increasing a ratio of a jump-down time (time in machining) Jdown as much as possible in the entire machining time.

One of the methods for solving this contradiction is, as shown in FIG. 6, to reduce the time Jt required for jumping by making a jumping velocity V (V=Jup/Jt) as fast as possible, however, if a jumping velocity V is speeded up, a load to a mechanical structure of the electric discharge machining apparatus becomes larger, which causes bad influences such as induction of mechanical vibrations or reduction of mechanical precision. For this reason, there is sometimes a case where a jumping velocity can not easily be increased. Especially in a case where an area to be machined is wide, it is known that a negative pressure is generated in a machining gap due to a delay in sucking a machining liquid when an electrode is pulled up so that the electrode can not easily be held up.

A reaction force generated when an adjacent plane form (electrode) is pulled up from a liquid (machining liquid) is described by the expression (1). Herein, F is a machining reaction force generated by a jumping operation, k: a proportionality constant, S: a machining area, V: a jumping velocity, and D: a machining gap.

$$F = k \cdot S^2 \cdot (V/D^3) \tag{1}$$

Namely, force generated in a machining gap in an initial stage of the jumping operation is proportional to the square of a machining area S and is inversely proportional to the cube of a machining gap D. For this reason, the machining reaction force F becomes extremely large in machining of a large area, especially in an operation for finishing.

Generally, when a large area is to be machined, as the machining reaction force F according to the expression (1) is proportional to the jumping velocity V, the jumping velocity V is set to a lower value so as not to induce reduction of precision due to an excessive load applied to a machine. It is understood from the expression (1) that the machining reaction force F is proportional to the square of an area from the expression (1), if an area to be machined becomes twice, a jumping velocity V has to be reduced to ¼ thereof. For this reason a time required for jumping largely increases, which causes a machining velocity to be reduced.

FIG. 7 shows jumping operations in a case where the jumping velocity is reduced. When the jumping velocity is reduced, a proportion of a period of time in machining Pp in the entire machining period of time is reduced, and also the machining velocity is reduced by the same proportion.

To avoid the phenomenon described above, there is sometimes employed a method of accelerating a jumping velocity by using the fact that a machining gap D is widened and also machining reaction force F is reduced by jumping. Namely, the jumping velocity v is changed so that the value $(V/D^3)$ in the expression (1) is constant.

With this method, the ratio of a machining area S does not always lead to increase in a jumping time V as it is, and for this reason a time required for jumping can further be optimized.

FIG. 8 is a view showing operations according to the method, and a leading edge section Jacc as well as a falling edge section Jred each of the jumping operations are accelerated or decelerated according to a machining gap length. In this case, the machining gap during jumping down is shown as Ddown.

FIG. 9 shows the characteristics in a case where the machining gap Ddown during jumping down becomes narrower in the same method. When the machining gap D in the expression (1) becomes smaller like Ddown, accelerated/decelerated velocities in the leading edge section Jacc as well as in the falling edge section Jred each in the jumping operations are made further smaller. Even in a case where an area to be machined S is large, a load to the machine can be suppressed also by changing the accelerated/decelerated velocities.

It should be noted that a machining velocity in a path for acceleration or deceleration is theoretically obtained in proportion to the cube of the machining gap D, however, the same effects can be obtained by making approximations to other high-speed computable path in consideration of computing performance inside of a numerical control unit.

However, it is still required to decide a constant for a jumping velocity V according to an area to be machined S, so that it is necessary to reset a jumping velocity V according to the area to be machined S.

Generally, this change is one of elements in machining conditions, so that it is selectable as one of the machining conditions. Namely, a jumping velocity notch is selected according to the machining contents, but it is not always easy to accurately estimate a machining reaction force F or a load to the machine according to a machining area S as well as to a machining gap length (machining gap D), and to select an optimal jumping velocity notch. Especially, when a large area is to be machined, it is not easy to optimize the jumping condition and to increase the machining velocity.

SUMMARY OF THE INVENTION

It is an object of the present invention to obtain a user-friendly electric discharge machining apparatus which can optimally set jumping conditions and increase a machining velocity without forcing a user to perform any complicated setting operation.

In the electric discharge machining apparatus according to the above invention, when a machining area by the machining area inputting means as well as a machining gap length by the machining gap length inputting means are inputted respectively, the jumping condition computing means computes an optimal jumping velocity from a value indicating a prespecified machine-allowable load for the electric discharge machining apparatus, a machining area inputted by the machining area inputting means, and a machining gap length inputted by the machining gap length inputting means.

In the electric discharge machining apparatus according to the above invention, the machining area computing means computes an area to be machined according to electric discharge machining conditions, the machining gap length computing means computes a machining gap length according to electric discharge machining conditions, and the jumping condition computing means computes an optimal jumping velocity from a value indicating a prespecified machine-allowable load for the electric discharge machining apparatus, a machining area computed by the machining area computing means, and a machining gap length computed by the machining gap length computing means.

In the electric discharge machining apparatus according to the above invention, the machining area computing means computes a machining area according to a ratio between a proceeding velocity in machining and a discharge pulse frequency having contributed to the machining.

In the electric discharge machining apparatus according to the above invention, the machining gap length computing means computes a machining gap length according to a current value of a machining current pulse as well as to a voltage loaded to a machining gap.

In the electric discharge machining apparatus according to the above invention, the driving load detecting means detects a driving load for a shaft-driving actuator, and the jumping condition computing means corrects a jumping velocity by the driving load detected by the driving load detecting means.

Other objects and features of this invention will become understood from the following description with reference to the accompanying drawings.

DESCRIPTION OF THE PREFERRED EMBODIMENTS

Detailed description is made for embodiments of the electric discharge machining apparatus according to the present invention with reference to the related drawings.

Figure 1:
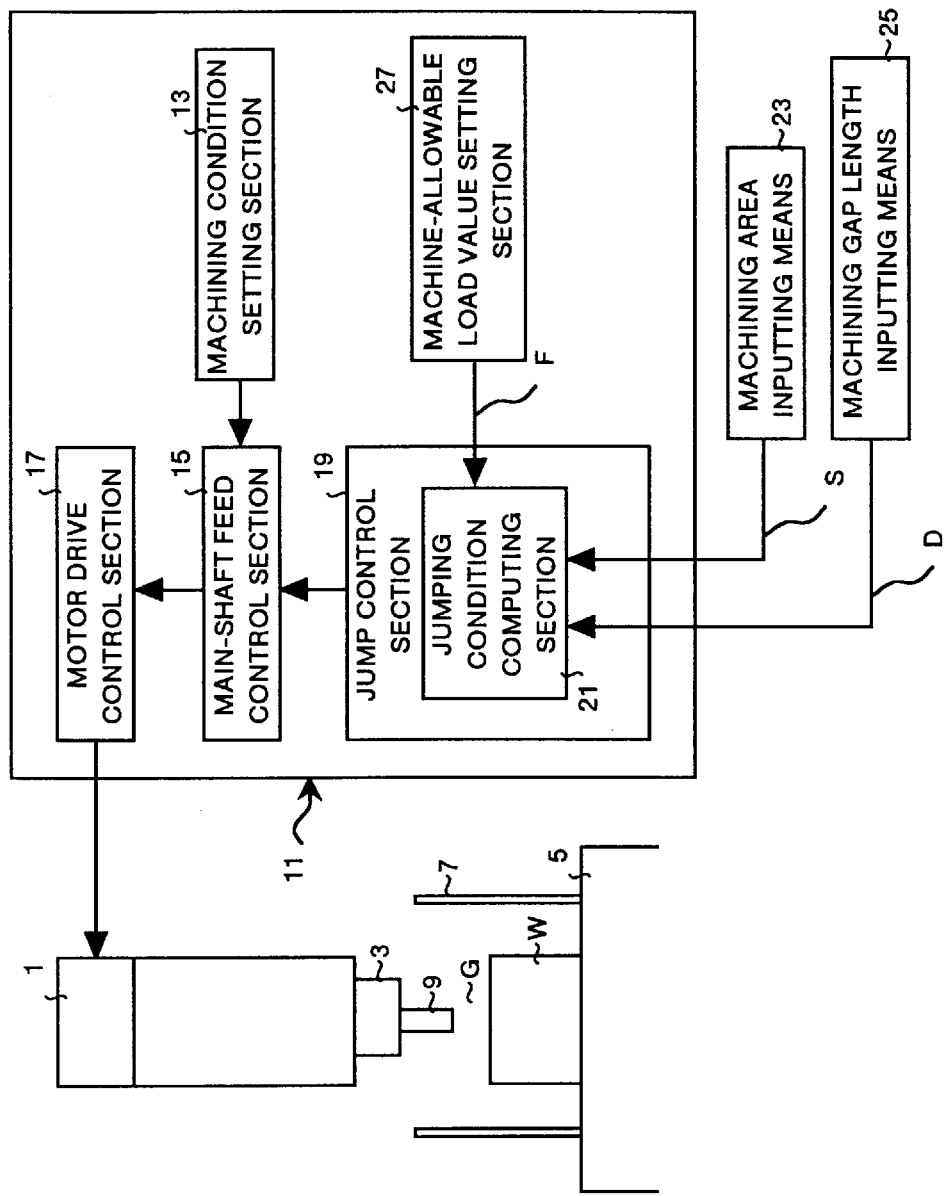
FIG. 1 is a block diagram showing Embodiment 1 of the electric discharge machining apparatus according to the present invention.

FIG. 1 shows Embodiment 1 of the electric discharge machining apparatus according to the present invention.

The electric discharge machining apparatus has a main shaft 3 driven by a motor 1 in the Z-axial direction and a machining vessel 7 placed on a work table 5, an electrode 9 is attached to the main shaft 3, and a machining liquid is putted in the machining vessel 7, and a work W is arranged therein.

The electrode 9 and the work W are located at positions opposite to each other with a machining gap G in the machining liquid, and the work W is melted and removed by supplying a pulse field power from a power source not shown in the figure to a space between the electrode 9 and the work W.

The motor 1 is driven and controlled by a numerical control unit 11. The numerical control unit 11 comprises a machining condition setting section 13 for setting machining conditions according to a machining program or the like, a main-shaft feed control section 15 for controlling the Z-axis according to machining conditions set by the machining condition setting section 13, a motor-drive control section 17 for driving and controlling the motor 1, and a jump control section 19.

The jump control section 19 has a jumping condition computing section 21, and both a machining area inputting means 23 for inputting an area to be machined S by opposing the electrode 9 and the work W to each other and a machining gap length inputting means 25 for inputting a machining gap length D machined by opposing the electrode 9 and the work W to each other are connected to the jumping condition computing means 21.

The machining area inputting means 23 and the machining gap length inputting means 25 are practically given through an input screen in the numerical control unit, and a machining area S as well as a machining gap length D are inputted by a user (operator) before the machining is started.

The jumping condition computing section 21 computes a jumping velocity V in jumping operations for enlarging the distance between the electrode 9 and the work W according to the expression (2) described below from a value F indicating a prespecified machine-allowable load for the electric discharge machining apparatus preset in a machine-allowable load value setting section 27, a machining area S inputted by the machining area inputting means 23, and a machining gap length D inputted by the machining gap length inputting means 25, and also sets a jumping-up rate Jup and a jump-down time Jdown.

$$V = F \cdot D^3 / k \cdot S^2 \quad (2)$$

Herein k indicates a proportional constant, and a value previously measured by experiments can be put in the constant. A machine-allowable load value F is a fixed value decided according to the mechanical structure.

With this feature, by inputting a machining area S and a machining gap length D in the numerical value control unit 11, an optimal jumping velocity V is automatically computed and set by the jumping condition computing section 21 inside the numerical value control unit 11.

A pattern of a jumping path based on this jumping velocity V is computed inside the numerical value control unit 11, and the jumping operation is performed.

By obtaining a jumping velocity as described above, a jumping velocity making the best use of a machine-allowable load value F can be decided, and a machining velocity can be optimized by suppressing the idling time during jumping up to a minimum value.

Figure 2:
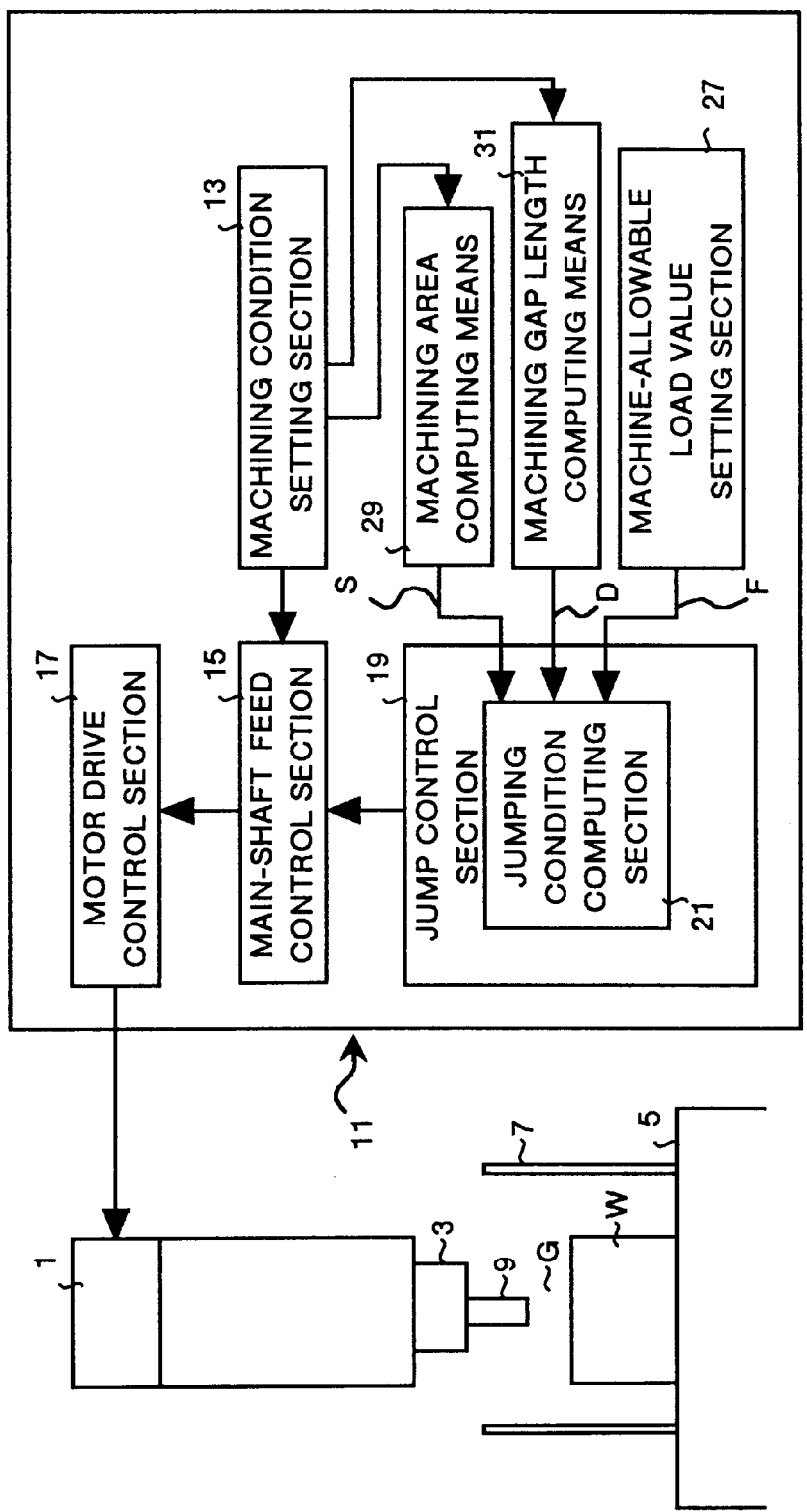
FIG. 2 is a block diagram showing Embodiment 2 of the electric discharge machining apparatus according to the present invention.

FIG. 2 shows Embodiment 2 of the electric discharge machining apparatus according to the present invention. It should be noted that, in FIG. 2, the same reference numerals are assigned to the same sections corresponding to those in FIG. 1, and description thereof is omitted herein.

In this embodiment, the numerical value control unit 11 has a machining area computing means 29 for computing an area to be machined S by opposing the electrode 9 and the work W to each other according to the electric discharge machining conditions and a machining gap length computing means 31 for computing a machining gap length D machined by opposing the electrode 9 and the work W to each other according to the electric discharge machining conditions.

Figure 3:
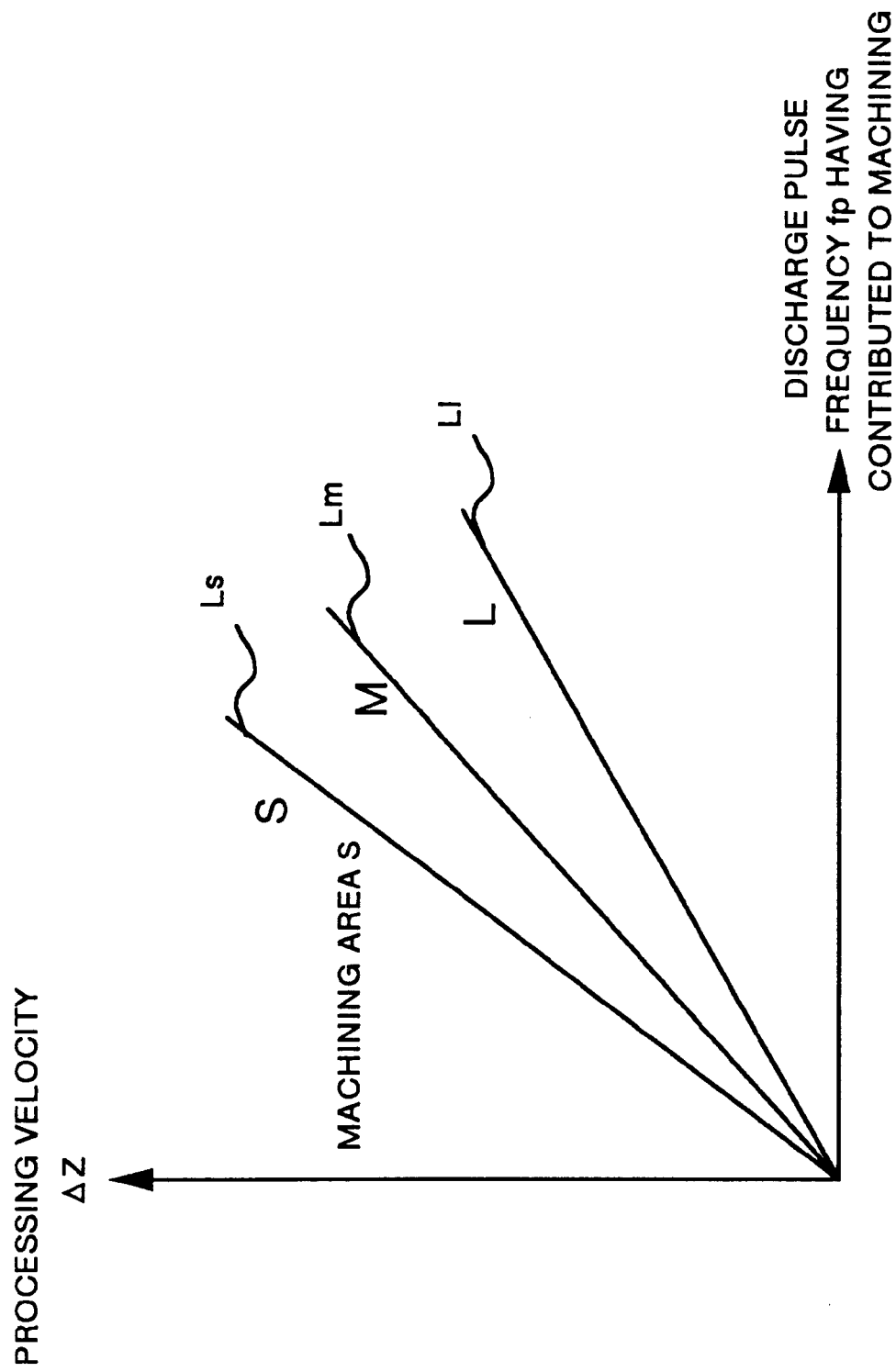
FIG. 3 is a graph showing a relation between a proceeding velocity in processing, a discharge pulse frequency having contributed to the machining, and a machining area.

A proceeding velocity Δz in machining and a discharge pulse frequency fp having contributed to the machining are known to be in a proportional relation as shown in FIG. 3. The discharge pulse having contributed to the machining can be computed by detecting any pulse not having contributed to the machining such as a short circuit from the number of generated discharge pulses to subtract the number therefrom. A function of classifying discharge pulses into classes depending on a degree of contribution to machining to detect them is provided, in most cases, in a pulse control section in a recent type of electric discharge machining apparatus, and the number of discharge pulses having contributed to the machining can be counted by making use of the function.

A relation of a ratio between the proceeding velocity Δz in machining and a discharge pulse frequency fp having contributed to the machining with a machining area S in certain electric discharge machining conditions is known to be in a proportional relation, so that a machining area S can be computed by previously measuring them in experiments. Namely, in a case where an area to be machined S is small, the proceeding velocity Δz in machining becomes higher as shown by the sign Ls in FIG. 3 in relation with the discharge pulse frequency fp having contributed to the machining. Reversely, in a case where an area to be machined is large, the proceeding velocity becomes lower as shown by the signs Lm and Ll therein.

With this feature, the machining area computing means 29 computes a machining area S according to a ratio between the proceeding velocity Δz in machining and the discharge pulse frequency fp having contributed to the machining with reference to the data shown in FIG. 3.

Conditions required for deciding a machining gap length D are such machining conditions as a current value of a machining current pulse and a gap voltage. Namely, a machining gap length is widened when current pulse energy is larger or a voltage loaded to a machining gap is higher. Both the current pulse and the gap voltage are parameters selectable to be set as ordinary machining conditions. Namely, a gap length can be decided by deciding machining conditions, so that it is possible to automatically set a machining gap length using data for machining conditions even if the operator does not make efforts to input therein the gap length.

With this feature, the machining gap length computing means 31 computes a machining gap length D according to a current value of a machining current pulse as well as to a voltage loaded to a machining gap.

The jumping condition computing section 21 computes a jumping velocity V in jumping operations for enlarging the distance between the electrode 9 and the work W according to the expression (2), like in a case in Embodiment 1, from a value F indicating a machine-allowable load for the electric discharge machining apparatus preset in a machine-allowable load value setting section 27, a machining area S computed by the machining area computing means 29, and a machining gap length D computed by the machining gap length computing means 31, and also sets a jumping-up rate Jup and a jump-down time Jdown.

With those operations, a jumping velocity making the best use of a machine-allowable load value F can be specified, and a machining velocity can be optimized by suppressing the idling time during jumping up to a minimum value, and in addition a machining area S as well as a machining gap length D are not required to be inputted, so that a user can omit time and effort required for inputting those data.

Figure 4:
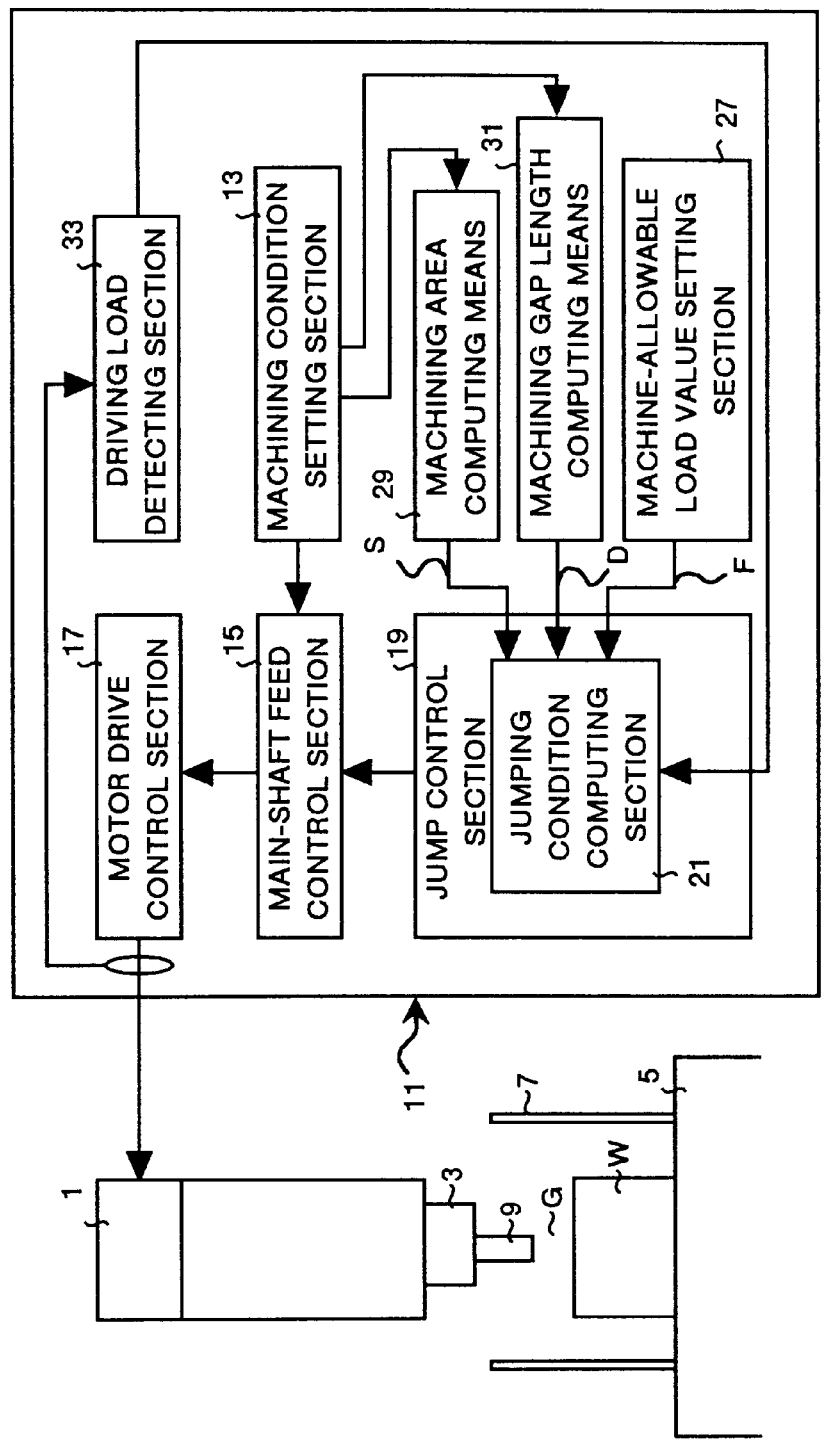
FIG. 4 is a block diagram showing Embodiment 3 of the electric discharge machining apparatus according to the present invention.
Figure 5:
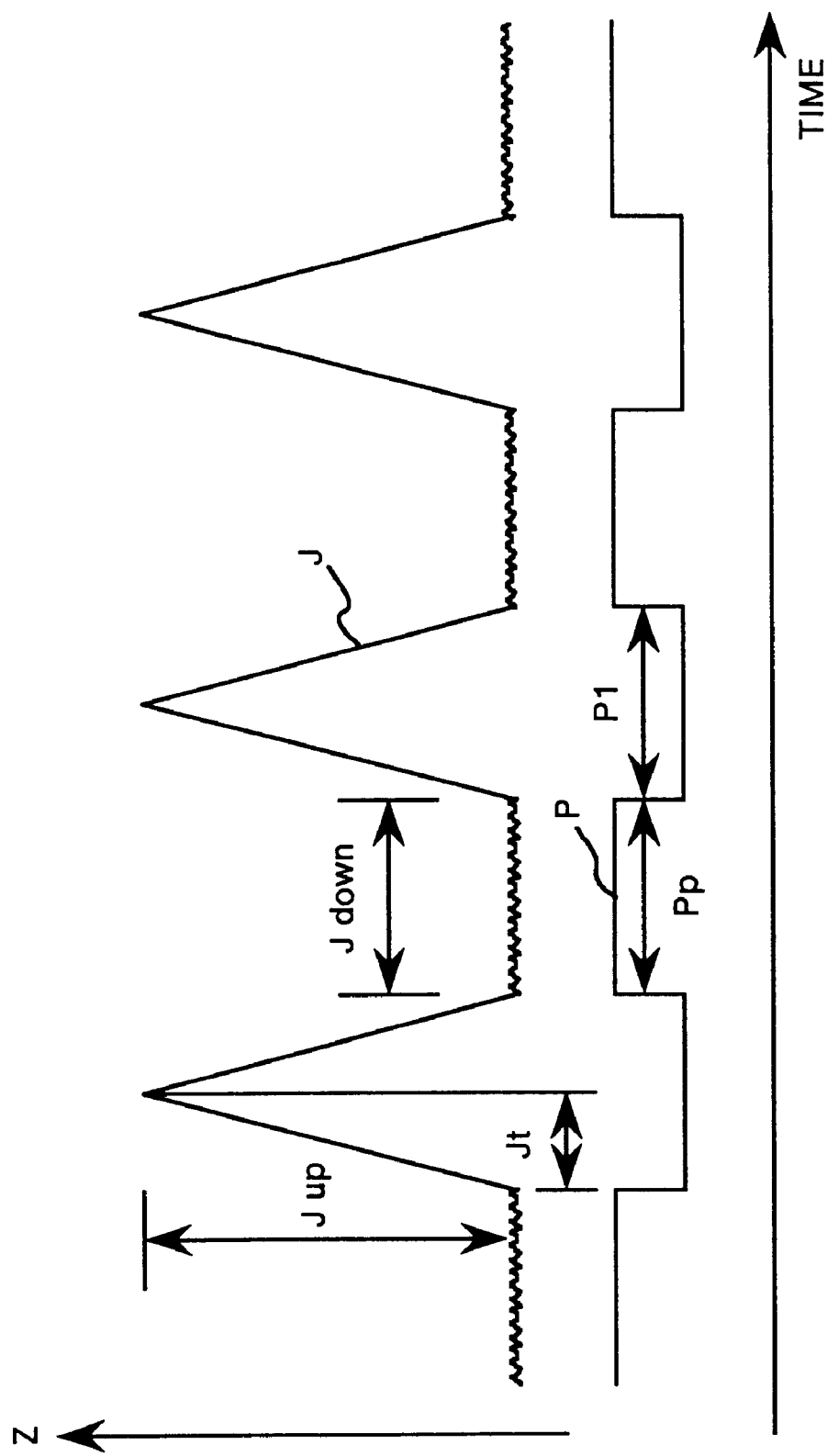
FIG. 5 is an operation view showing a jumping path and electric discharge machining time characteristics in a jumping operation respectively in the conventional type of electric discharge machining apparatus.
Figure 6:
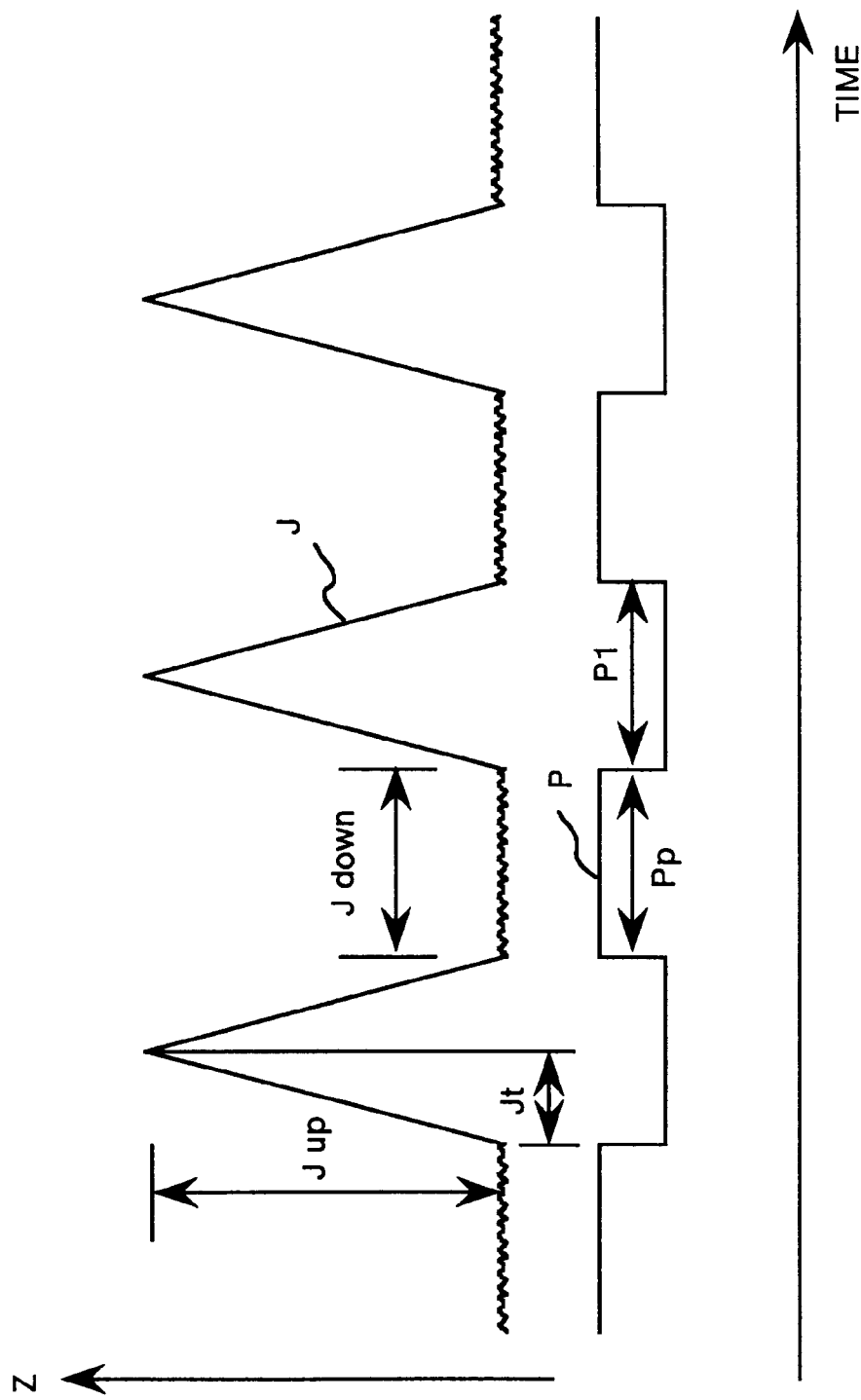
FIG. 6 is an operation view showing a jumping path and electric discharge machining time characteristics in a jumping operation respectively in a case of increasing the jumping velocity in the conventional type of electric discharge machining apparatus.
Figure 7:
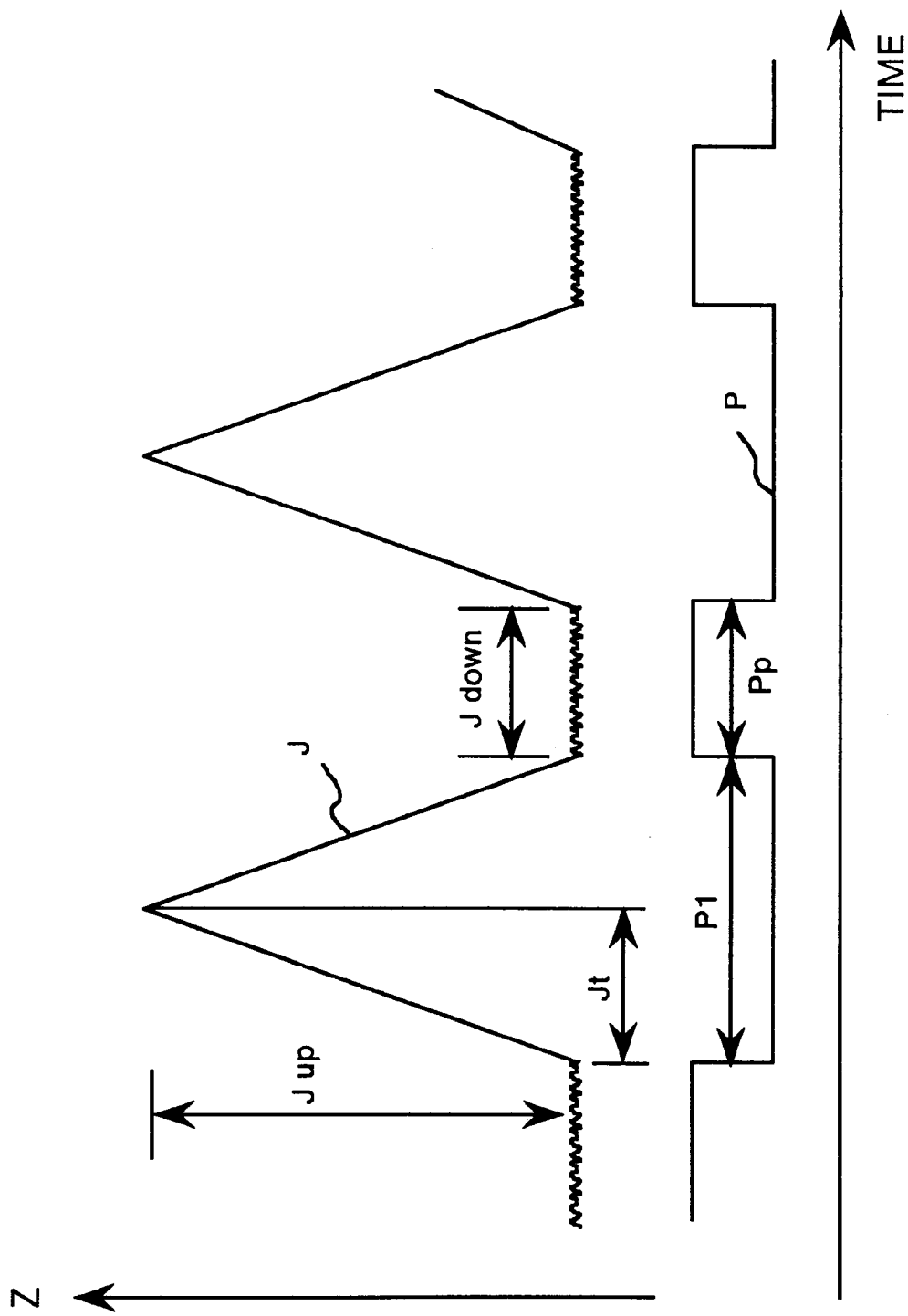
FIG. 7 is an operation view showing a jumping path and electric discharge machining time characteristics in a jumping operation respectively in a case of reducing the jumping velocity in the conventional type of electric discharge machining apparatus.
Figure 8:
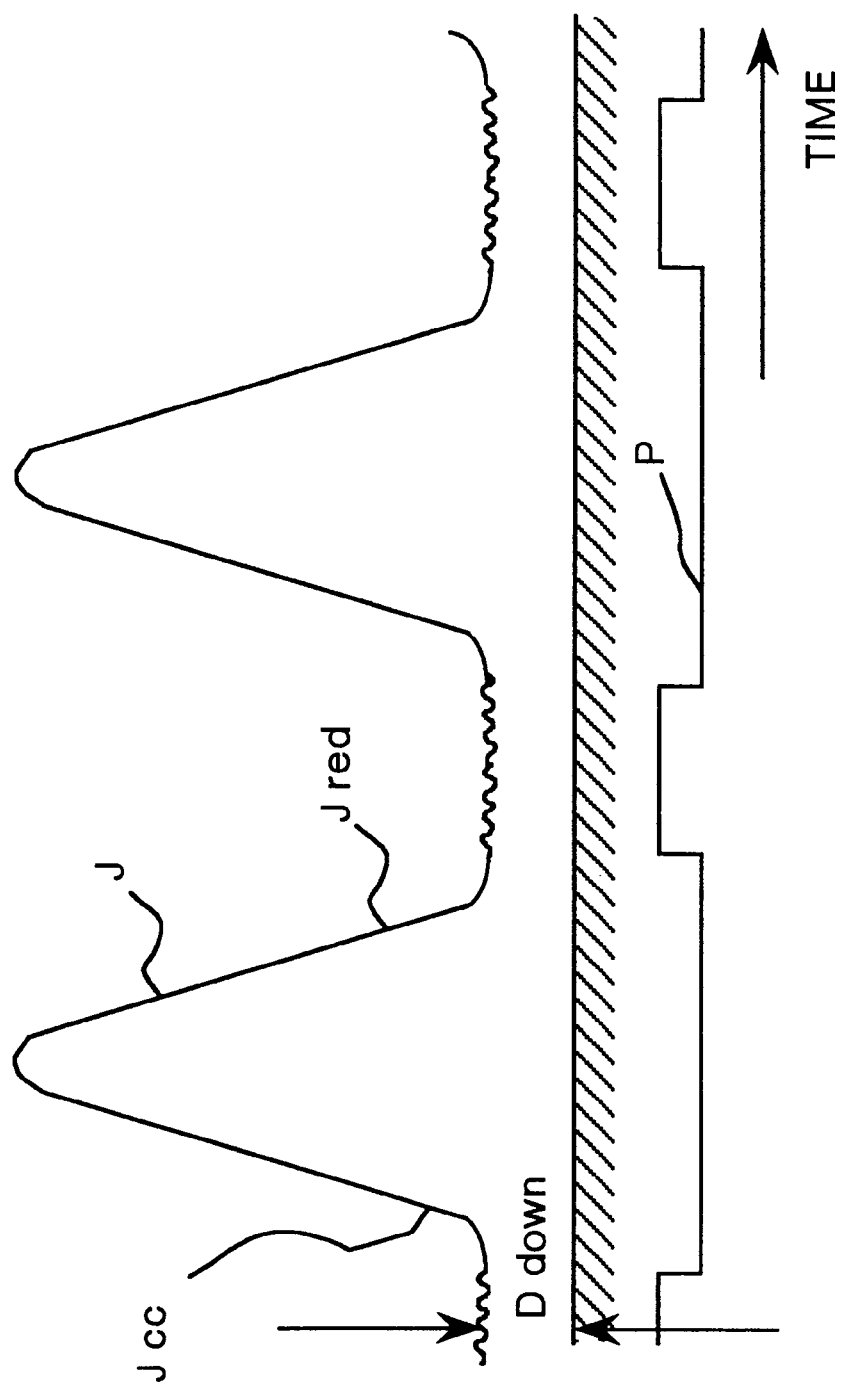
FIG. 8 is an operation view showing a jumping path and electric discharge machining time characteristics in a jumping operation respectively based on a system in which the jumping velocity is changed according to a machining gap (when a machining gap is wide)
Figure 9:
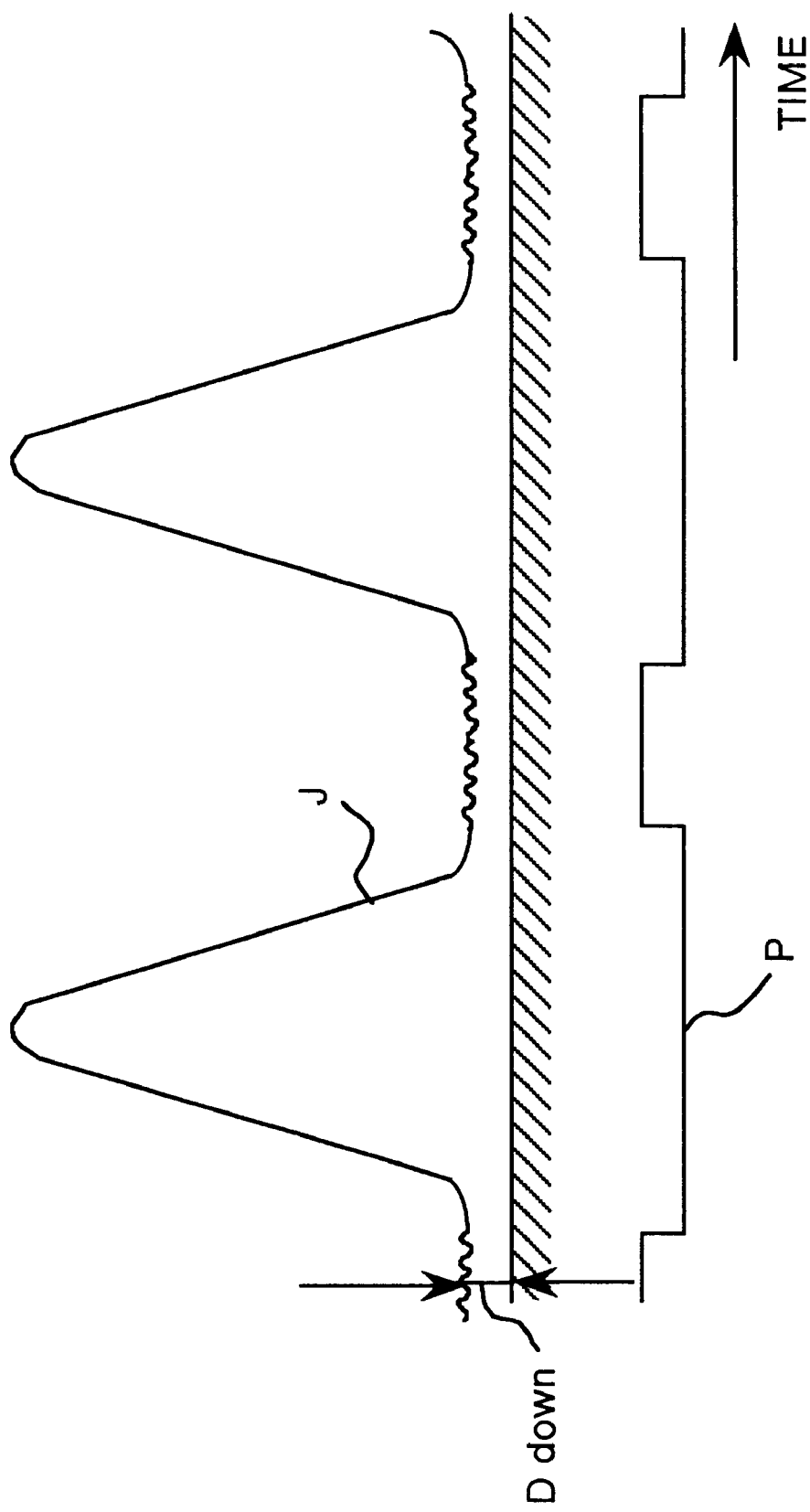
FIG. 9 is an operation view showing a jumping path and electric discharge machining time characteristics in a jumping operation respectively based on a system in which the jumping velocity is changed according to a machining gap (when a machining gap is narrow).

FIG. 4 shows Embodiment 3 of the electric discharge machining apparatus according to the present invention. It should be noted that, in FIG. 4, the same reference numerals are assigned to the same sections corresponding to those in FIG. 1, and description thereof is omitted herein.

In this embodiment, a shaft-driving actuator in the electric discharge machining apparatus, namely a driving load detecting section 33 for detecting a driving load of the motor 1 is provided therein. The jumping condition computing section 21 inputs a driving load detected by the driving load detecting section 33 and corrects a computed jumping velocity V. The correction can be executed by adding or subtracting a proportionality constant k in the jumping velocity computation expression (2) thereto or therefrom so that a difference between the driving load (actual load value) F' detected by the driving load detecting section 33 and the machine-allowable load value F will be zero.

With this feature, the actual load value can be fed back for control, so that it is possible to increase a jumping velocity V at any time to the highest and to maximize machining efficiency as well as a machining velocity within a machine-allowable load value.

Accordingly, a jumping velocity V can optimally be set according to an error in a machining area S computed by the machining area computing means 29 for computing a machining area S, an error in a machining gap length D computed by the machining gap length computing means 31, and to displacement of a proportional jumping velocity constant k from the optimal value even if any error is happened to be in computation of the jumping velocity.

It should be noted that Embodiment 3 can be executed by combining Embodiment 1 therewith.

As understood from the above description, with the electric discharge machining apparatus according to the present invention, only when a machining area by the machining area inputting means as well as a machining gap length by the machining gap length inputting means are inputted respectively, the jumping condition computing means computes a jumping velocity from a value indicating a prespecified machine-allowable load for the electric discharge machining apparatus, a machining area inputted by the machining area inputting means, and a machining gap length inputted by the machining gap length inputting means, so that an optimal jumping velocity to a machine-allowable load can be set, which makes it possible to enhance machining efficiency as well as to increase a machining velocity.

With the electric discharge machining apparatus according to another feature of the present invention, the machining area computing means computes an area to be machined according to electric discharge machining conditions, the machining gap length computing means computes a machining gap length according to electric discharge machining conditions, and the jumping condition computing means computes a jumping velocity from a value indicating a prespecified machine-allowable load for the electric discharge machining apparatus, a machining area computed by the machining area computing means, and a machining gap length computed by the machining gap length computing means, so that even if a user does not input data therein, an optimal jumping velocity can automatically be set, which makes it possible to enhance machining efficiency as well as to increase a machining velocity.

With the electric discharge machining apparatus according to another feature of the present invention, the machining area computing means computes a machining area according to a ratio between a proceeding velocity in machining and a discharge pulse frequency having contributed to the machining, so that a machining area can accurately and automatically be computed, and even if a user does not input data therein, an optimal jumping velocity can automatically be set, which makes it possible to enhance machining efficiency as well as to increase a machining velocity.

With the electric discharge machining apparatus according to another feature of the present invention, the machining gap length computing means computes a machining gap length according to a current value of a machining current pulse as well as to a voltage loaded to a machining gap, so that a machining gap length can accurately and automatically be computed, and even if a user does not input data therein, an optimal jumping velocity can automatically be set, which makes it possible to enhance machining efficiency as well as to increase a machining velocity.

With the electric discharge machining apparatus according to another feature of the present invention, the driving load detecting means detects a driving load for a shaft-driving actuator, and the jumping condition computing means corrects a jumping velocity by the driving load detected by the driving load detecting means, so that each error occurring in a process for computing an optimal jumping velocity from a machining area and a machining gap length can be reduced and the jumping velocity can be optimized with higher precision, which makes it possible to enhance machining efficiency as well as to increase a machining velocity.

This application is based on Japanese patent application No. HEI 9-107829 filed in the Japanese Patent Office on Apr. 24, 1997, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An electric discharge machining apparatus for machining a work in a machining liquid by supplying pulse power to a gap between an electrode and the work each provided in the machining liquid; said electric discharge machining apparatus comprising:

a machining area inputting section for inputting an area to be machined by opposing said electrode and said work to each other;

a machining gap length inputting section for inputting a machining gap length for machining; and a jumping condition computing section for computing a jumping velocity during a jumping operation, said jumping operation enlarging a distance between said electrode and said work, said velocity being computed on the basis of a value indicating a prespecified machine-allowable load for the electric discharge machining apparatus, a machining area inputted by said machining area inputting section, and a machining gap length inputted by said machining gap length inputting section.

2. An electric discharge machining apparatus according to claim 1, comprising; a driving load detector for detecting a driving load for a shaft-driving actuator in the electric discharge machining apparatus; wherein a driving load detected by said driving load detector is inputted to said jumping condition computing section to correct a jumping velocity computed by said jumping condition computing section.

3. An electric discharge machining apparatus for machining a work in a machining liquid by supplying pulse power to a gap between an electrode and the work each provided in the machining liquid; said electric discharge machining apparatus comprising:

a machining area computing section for computing an area to be machined by opposing said electrode and said work to each other according to electric discharge machining conditions;

a machining gap length computing section for computing a machining gap for machining according to the electric discharge machining conditions; and a jumping condition computing section for computing a jumping velocity in a jumping operation, jumping operation enlarging the distance between said electrode and said work, said velocity being computed on the basis of a value indicating a prespecified machine-allowable load for the electric discharge machining apparatus, a machining area computed by said machining area computing section, and a machining gap length computed by said machining gap length computing section.

4. An electric discharge machining apparatus according to claim 3, comprising; a driving load detector for detecting a driving load for a shaft-driving actuator in the electric discharge machining apparatus; wherein a driving load detected by said driving load detector is inputted to said jumping condition computing section to correct a jumping velocity computed by said jumping condition computing section.

5. An electric discharge machining apparatus according to claim 3; wherein said machining gap length computing section computes a machining gap length according to a current value of a machining current pulse as well as a voltage load at said machining gap.

6. An electric discharge machining apparatus according to claim 3; wherein said machining area computing section computes a machining area according to a ratio between a machining velocity and a discharge pulse frequency contributing to the machining.

7. An electric discharge machining apparatus according to claim 6, comprising a driving load detector for detecting a driving load for a shaft-driving actuator in the electric discharge machining apparatus; wherein a driving load detected by said driving load detector is inputted to said jumping condition computing section to correct a jumping velocity computed by said jumping condition computing section.

8. An electric discharge machining apparatus according to claim 6; wherein said machining gap length computing section computes a machining gap length according to a current value of a machining current pulse as well as a voltage load at said machining gap.

9. An electric discharge machining apparatus according to claim 8, comprising; a driving load detector for detecting a driving load for a shaft-driving actuator in the electric discharge machining apparatus; wherein a driving load detected by said driving load detector is inputted to said jumping condition computing section to correct a jumping velocity computed by said jumping condition computing section.

* * * * *